United States Patent [19]

Cox et al.

[11] Patent Number: 4,837,195

[45] Date of Patent: Jun. 6, 1989

[54] PROCESS FOR POROSITY CONTROL AND REHYDROXYLATIONS OF SILICA BODIES

[75] Inventors: Geoffrey B. Cox; Richard W. Stout, both of Wilmington, Del.

[73] Assignee: E. I. Du Pont de Nemours and Company, Wilmington, Del.

[21] Appl. No.: 228,761

[22] Filed: Aug. 4, 1988

Related U.S. Application Data

[63] Continuation of Ser. No. 945,792, Dec. 23, 1986, abandoned.

[51] Int. Cl.$^4$ .................. B01J 20/10; C01B 33/12; B01D 15/08
[52] U.S. Cl. .................................. 502/408; 55/67; 55/386; 210/198.2; 210/656; 423/335; 502/10; 502/407
[58] Field of Search ............... 502/10, 407, 408, 158, 502/232; 423/335; 55/67, 386; 210/198.2, 656

[56] References Cited

U.S. PATENT DOCUMENTS

| | | | |
|---|---|---|---|
| 3,453,806 | 7/1969 | Filbert et al. | 55/67 |
| 3,485,587 | | Keston | 23/230 |
| 3,485,687 | 12/1969 | Chapman | 156/635 |
| 3,650,960 | 3/1972 | Strauss et al. | 252/79.3 |
| 3,650,960 | 3/1972 | Strauss et al. | 252/79.3 |
| 3,666,530 | 5/1972 | Ave et al. | 55/386 |
| 3,782,075 | 1/1974 | Kirkland | 210/198.2 |
| 3,857,924 | 12/1974 | Halasz et al. | 502/8 |
| 3,881,944 | 5/1975 | Beall et al. | 502/ |
| 4,010,242 | 3/1977 | Iler et al. | 423/335 |
| 4,131,542 | 12/1978 | Bergna et al. | 502/9 |
| 4,376,641 | 3/1983 | Nestrick et al. | 55/67 |
| 4,459,173 | 7/1984 | Peters | 252/79.3 |
| 4,477,492 | 10/1984 | Bergna et al. | 210/656 |

OTHER PUBLICATIONS

*Introduction to Liquid Chromtography*–Snyder & Kirkland, John Wiley & Sons Inc., New York–1979–pp. 272–278.
Chemical Abstract, vol. 103, 1985, p. 246, Abstract No. 75092k, Columbus, Ohio, U.S.A.; A. R. Timokhin et al.: "Chemical Interaction Between Ammonium Bifluoride and Quartz Glass" & Steklo Keram. 1985, (6), 13–15.
Introduction to Liquid Chromotography–Snyder & Kirkland, John Wiley and Sons Inc., New York 1979, pp. 272–278.
Unger et al., J. Chromatog., vol. 296, 3 (1984).
Knox et al., J. Chromatog., vol. 185, 289 (1979).
Engelhardt et al., J. Chromatog., vol. 218, 395 (1981).
Kohler et al., J. Chromatog., vol. 352, 275 (1986).
Vespalec et al., J. Chromatog., vol. 354, 129–143 (1986).

*Primary Examiner*—Paul E. Konopka

[57] ABSTRACT

The porosity of a porous silica body is increased in a controlled manner by contacting the body with an effective amount of ammonium bifluoride.

2 Claims, No Drawings

PROCESS FOR POROSITY CONTROL AND REHYDROXYLATIONS OF SILICA BODIES

This application is a continuation of Ser. No. 06/945,792 filed Dec. 23, 1986, now abandoned.

BACKGROUND OF THE INVENTION

Silica bodies, whether porous, non-porous or superficially porous, are used as solid supports for the construction of stationary phases in liquid chromatography. There are many processes for producing such silica bodies. Methods for producing porous bodies include crushing and grading silica and precipitation from sodium silicate solutions. Other processes for preparing porous microspheres are described in U.S. Pat. No. 3,857,924, issued to Halasz et al, U.S. Pat. No. 4,131,542, issued to Bergna et al, U.S. Pat. No. 4,477,492 issued to Bergna et al.

Another process for preparation of a highly desirable porous silica for use in chromatography is described by Iler et al. in U.S. Pat. No. 4,010,242. The process described is a coacervation process in which silica sol particles and a urea-formaldehyde polymer form micron-size liquid droplets. These droplets when hardened, are harvested and fired at high temperature to burn out the organic binder leaving behind porous silica microspheres. This firing process also serves to sinter the silica sol particles to their immediate neighbors, thereby building up the particle aggregate and strengthening the aggregate. Silica microspheres prepared by such a procedure are available from E. I. du Pont de Nemours & Co., Inc., (Wilmington, DE) under the tradename Zorbax®.

The silica microspheres of Iler et al. have the desirable properties of being mechanically very strong, having a very narrow particle diameter range, a narrow pore size distribution and a uniform pore distribution. Mechanical strength is desirable to resist crushing during column packing or use. Narrow particle diameter range and pore and pore size distribution are desirable properties for efficient size exclusion chromatography.

Unfortunately, silica microspheres of Iler et al. have the undesirable properties of having a dehydroxylated surface, limited porosity [Unger et al., J. Chromatog., Volume 296, 3 (1984) and Knox et al., J. Chromatog., Volume 185, 289 (1979)] and an acidic surface [Engelhardt et al., J. Chromatog., Volume 218, 395 (1981) and Kohler et at., J. Chromatog., Volume 352, 275 (1986)]. By dehydroxylation is meant the elimination of surface silanol groups with concomitant formation of siloxane groups. This dehydroxylation results from the thermal treatment to burn out the organic polymer. This is undesirable as the silanol groups are the groups to which bonded phases, such as silanes, are attached. The limited porosity also results from the thermal treatment which also serves to sinter the microspheres to achieve the desired mechanical strength. As higher temperatures and longer treatment times are used, the porosity of the resulting particles decreases. This is particularly undesirable in size exclusion chromatography where porosity has a direct effect upon resolution. The acidic surface may also result from the sintering process. The nature of the acidic sites on the surface is not known, but may be due to cationic impurities or pyrolyzed carbon remaining on the surface. An acidic surface is undesirable in that it leads to non-symmetrical peak shapes during chromatography of basic compounds [Kohler et al., J. Chromatog., Volume 352, 275 (1986)].

A variety of processes are known for cleaning and rehydroxylating silica surfaces. Nestrick et al. (U.S. Pat. No. 4,376,641 issued Mar. 15, 1983) disclose a hot acid leaching process for cleaning and rehydroxylating the inner column surface of glass capillary tubes for use in gas chromatography. The cleaning aspects of this treatment are said to remove undesirable cationic species from the surface. This hot acid leaching process is reported to be used following a surface etching procedure. The surface etching is accomplished with methanolic solutions of $KHF_2$ or $NH_4HF_2$ (ammonium bifluoride).

A variety of processes are known for increasing the pore size of silica bodies. Vespalec et al. [J. Chromatogr., Volume 354, 129–143 (1986)] report that specific pore volume of silica can be increased by treatment with phosphate ion containing solutions. Control of the increase in porosity is not taught.

Keston (U.S. Pat. No. 3,485,687 issued Dec. 23, 1969) disclose a process for increasing the pore size of porous glass by treating with ammonium fluorides, such as ammonium bifluoride, and mineral acid at elevated temperature. The mineral acid treatment is said to release HF in situ thereby dissolving the glass and increasing the pore size. The ammonium bifluoride is reported to be ineffective when used alone.

Filbert et al. (U.S. Pat. No. 3,453,806 issued July 8, 1969) describe the use of aqueous HF or ammonium bifluoride to surface leach non-porous alkali-silicate beads to increase the surface available for binding to a liquid solvent useful in gas chromatography. It is suggested that leaching roughens or grooves the surface of the beads. They report that control of the leaching process is achieved by selection of the particular reagent, the strength of the leaching solution, the temperature of the solution and the length of treatment time.

Strauss et al. (U.S. Pat. No. 3,650,960 issued Mar. 21, 1972) describe the use of a mixture of HF and ammonium fluoride to etch silicon dioxide for use in semi-conductor devices. Kirkland in a patent application, Ser. No. 798,333, filed Nov. 1, 1985, prepares microspheres for chromatographic application according to a process comprising contacting heat strengthened thermally-dehyroxylated porous silica miscrospheres having a total concentration of silanol groups of less than about 5.5 $\mu mol/m^2$ with water in the presence of HF or at least one basic activator selected from the group consisting of quaternary ammonium hydroxides, ammonium hydroxide, and organic amines at a temperature of from about ambient temperature to about 100° C. for sufficient time to generate a desired concentration of silanol groups.

Despite all of this background knowledge, there remains a need for an improved method of increasing the porosity of silica bodies in a controlled way and also cleaning the surface of said silica bodies.

SUMMARY OF THE INVENTION

The process of increasing the porosity, i.e., surface area, of a porous silica body in a controlled manner and also cleaning the surface of said silica body by contacting said body with an effective amount of ammonium bifluoride. The process is effective also to rehydroxylate the surface of a silica body and is rapid and relatively inexpensive.

The chromatographic support comprises silica bodies which have been treated with ammonium bifluoride. The silica bodies have enhanced porosity, and their surfaces are clear and hydroxylated. This enhances resolution in HPLC in the gel-filtration mode and facilitates the attachment of bonded phases to the silica body for chromatographic packing material.

DESCRIPTION OF THE PREFERRED EMBODIMENTS

Surprisingly, it has been found that aqueous solutions of ammonium bifluoride [$(NH_4)HF_2$] are effective at rapidly increasing the porosity of silica bodies to a controlled specific degree and also cleaning the surface of said bodies. Both objects are believed to be accomplished by removal of the silica from the surface of such bodies. This removal appears to be the result of a quantitative reaction between the ammonium bifluoride and the silica. The quantitative nature of this reaction allows precise control of the increase in porosity of porous silica bodies as is described below. The surface cleaning accomplished by the method of this invention appears to remove both acidic sites and hydrophobic sites as is discussed in more detail below.

The process of this invention can be used with any silica body; however, porous spherical silica bodies are preferred and those silica bodies produced according to Iler et al. (U.S. Pat. No. 4,010,242) are most preferred. The bodies of Iler et al. can be further treated according to Stout (U.S. Pat. No. 4,600,646) and the resulting bodies are also highly preferred. The silica bodies thus prepared for chromatographic applications most advantageously are porous silica microspheres having an average diameter of about 0.5 to about 35 $\mu$m. Substantially all of the microspheres have a diameter ranging from about 0.5 to about 1.5 times the average diameter. The microspheres consist essentially of a plurality of substantially uniform-sized colloidal particles, having a silica surface, arranged in an interconnected three-dimensional lattice. The colloidal particles occupy less than about 50 volume percent of the microspheres. The remaining volume is occupied by interconnected pores having a substantially uniform pore size distribution. The process of this invention is expected to find its greatest utility with silica bodies that are significantly dehydroxylated; however, the porosity modification and surface cleaning aspects of this invention can be advantageously used with fully hydroxylated silica bodies.

The solution concentrations of $(NH_4)HF_2$ employed can range from about 1% (w/v) to about 35% (w/v) in water. The aqueous concentration, however, is not critical. The weight ratio ($\beta$) of $(NH_4)HF_2$ to silica is the more important consideration since it has been found that a given quantity of $(NH_4)HF_2$ rapidly reacts with and removes a given quantity of silica even if extended treatment times are used. Thus, selection of the amount of $(NH_4)HF_2$ to be used determines the amount of silica removed. It has been empirically determined that a linear relationship exists between the porosity of the treated silica and the ratio $\beta$.

This can be expressed mathematically as follows:

$$\Phi = \Phi° + m(\beta)$$

Thus knowing the initial porosity ($\Phi°$) of the silica bodies and the slope m, the amount of $(NH_4)HF_2$ required to obtain a given porosity ($\Phi$) can be determined. The slope is easily determined by experimentation over a limited range of $\beta$. For the preferred spherical silica microspheres, m has been found to range from about 0.10 to 0.14. Obviously, this relationship cannot be extended to the extreme where all the silica making up the body has been removed. In general, the ratio $\beta$ can range from about 0.01 to about 2.0. Ratios greater than 2.0 will lead to excessive removal of silica making the resulting bodies too fragile to be useful. The range of acceptable $\beta$ ratios is expected to vary somewhat depending upon the pore size, degree of sintering and nature of the silica bodies employed. Calculating the final porosity using the above equation for the preferred microspheres which have an initial porosity, as noted above, of about 0.5, yields an acceptable range of porosities from about 0.5 to 0.8.

Treatment of the silica bodies can be accomplished in many ways. It is generally preferred to suspend the silica to be treated in water and then add a solution of $(NH_4)HF_2$ to the suspension of silica. Treatment times can range from about 10 minutes to about 72 hours with 15 minutes being preferred. The amount of silica removed is not significantly altered with extended treatment times out to about 72 hours when some redeposition of silica is observed. The time required for this reaction can depend upon the size, shape and nature of silica used, but for the preferred spherical silica microspheres the reaction is generally complete in about 15 minutes.

Following treatment, the treated silica is collected by filtration and washed, typically with water, methanol, and Freon ® fluorocarbon solvents, then air dried and finally dried under vacuum. After completion of this process, the packing material can be packed into a chromatographic column using standard slurry techniques. These materials are highly suitable for size-exclusion chromatography. It is sometimes preferred to treat the rehydroxylated bodies with a reagent, typically an organosilane, to attach a bonded phase. Methods of attaching bonded phases to silica bodies are well known and are generally applicable to the rehydroxylated silica bodies produced by the process of this invention.

The increased porosity achieved by treating porous silica with $(NH_4)HF_2$ can be characterized in several ways. Porosity can be measured by standard nitrogen desorption methods (BET analysis). Using this technique, specific surface area, specific pore volume and average pore size can be determined. The surface area, specific pore volume and average pore size all increase linearly with increasing $\beta$ ratio.

Porosity can also be determined from a chromatographic experiment. The treated silica is packed into columns and various chromatographic parameters are calculated from the elution profile of a series of polystyrene molecular weight standards. Porosity ($\Phi$) can be calculated according to the equation:

$$\Phi = (V_m - V_o)/(V_c - V_o)$$

where $V_o$ = void volume; $V_m$ = total permeation volume; and $V_c$ = volume of the empty chromatographic column. Specific pore volume ($\sigma$) can also be calculated from the same experiment according to the equation:

$$\sigma = (V_m - V_o)/[\delta(V_c - V_m)]$$

where $V_m$, $V_o$ and $V_c$ have the same meaning as above and $\delta$ is the density of silica (2.2 g/cm$^3$). This method also indicates a linear relationship between $\sigma$ or $\Phi$ and the $\beta$ ratio. This linear relationship allows one to control this process. By knowing the slope of this relationship, the amount of $(NH_4)HF_2$ to be used to obtain a desired porosity can be calculated. Since the time and temperature of treatment have essentially no effect on the increase in porosity, selection of the proper amount of $(NH_4)HF_2$ is all that is required to achieve the desired result. Thus the process is very simple and reliable.

The presence of acidic sites on the surface of a silica body can be monitored using an ion-exchange chromatographic experiment. The experiment is simple, the chromatographic retention of a basic compound is monitored as a function of the buffer concentration of the mobile phase. Removal of acidic sites is observed in the ion-exchange experiment as reduced retention of the basic compound. Examples 2 through 4 report the results of experiments of this type. Using this ion-exchange procedure, it has been found that the silica supports of this invention show significantly less surface acidity than untreated supports or than supports which had been treated with hot nitric acid. It was also found that the surface acidity of the treated silica was independent of the $\beta$ ratio provided that sufficient $(NH_4)HF_2$ was used to remove the surface layer of silica. This was generally achieved with a $\beta$ ratio of greater than about 0.2.

The removal of the surface layer also removes hydrophobic sites and appears to result in exposure of a more fully hydroxylated surface. The more fully hydroxylated surface results from exposure of what was formerly the interior of the body. Since the interior of the particle undergoes less dehydroxylation during sintering, this newly exposed surface contains a greater number of silanol groups than that removed. A reverse phase chromatography experiment, similar to the ion-exchange experiment for monitoring acidic sites can be used to monitor hydrophobic sites. In this experiment, the capacity factor for toluene is monitored as a function of methanol content of the mobile phase. A lower capacity factor is indicative of few hydrophobic sites. Such hydrophobic sites are gererally believed to be due to siloxane groups, Example 5 reports such an experiment.

The silica body resulting from aqueous $(NH_4)HF_2$ treatment has the following desirable properties: the porosity is increased, the surface has been cleaned by virtue of removing the outer layer of silica; and the exposed surface is more fully hydroxylated. The increased porosity is evidenced both as an increase in specific surface area and as an increase in specific pore volume.

The following examples further illustrate the invention:

EXAMPLE 1

Porosity Control of Porous Silica

A. Porosity Control on Zorbax ® PSM 500

A series of 10.00±0.02 g samples of PSM 500 porous silica microspheres, (available from E. I. du Pont de Nemours & Co., Inc., Wilmington, DE) were placed in 250 mL plastic beakers. To each sample, 50.0 mL of deionized water was added. In separate beakers, a quantity of $(NH_4)HF_2$ was weighed and 50 mL of deionized water was added to dissolve the salt. Both corresponding sets of beakers were stirred using a magnetic stirrer and Teflon ®-coated magnetic stir bar. The quantities of ammonium bifluoride used are listed in Table I.

While rapidly stirring the silica slurry, the corresponding salt solution was rapidly added. The reaction was allowed to proceed at room temperature for 15 minutes. After the 15 minutes, the slurry was poured into a 600 mL sintered glass funnel and filtered. The wet cake was washed three times with 100 mL aliquots of deionized water, then with three 100 mL aliquots of methanol (Baker Chemical ® HPLC grade), and finally with two 100 mL aliquots of Freon ® TP (E. I. du Pont de Nemours & Co., Wilmington, DE). The cake was briefly air-dried in the filter and then placed in the fume hood for 30 minutes. The semi-dry cake was placed in a vacuum oven for 30 minutes at a temperature of 110° C. at a pressure of 24 inches Hg. All samples were treated in this manner. The reaction conditions are summarized in Table 1.

TABLE I

| | Ammonium Bifluoride Treatment of PSM 500 | | |
|---|---|---|---|
| Reaction Number | Weight of Silica (g) | Weight of $(NH_4)HF_2$ (g) | Weight of $(NH_4)HF_2$ Weight of Silica ($\beta$) |
| 1 | 10.00 | 0.00 | 0.0000 |
| 2 | 10.00912 | 1.00489 | 0.1004 |
| 3 | 10.00714 | 1.20056 | 0.1199 |
| 4 | 10.01396 | 1.40523 | 0.1403 |
| 5 | 10.01225 | 1.61113 | 0.1609 |
| 6 | 10.01450 | 1.81252 | 0.1810 |
| 7 | 10.00990 | 2.01400 | 0.2012 |
| 8 | 10.00726 | 4.00574 | 0.4003 |
| 9 | 10.00820 | 6.00535 | 0.6000 |
| 10 | 10.00158 | 8.00755 | 0.8006 |
| 11 | 10.01022 | 12.00725 | 1.1994 |
| 12 | 10.0221 | 14.00520 | 1.3974 |

5-8 gram samples of each silica (Reaction Numbers 1-10) were slurried in 80 mL neat methanol (Baker Chemical, HPLC grade) and placed in a column loading machine similar to that described by L. R. Snyder et al. [L. R. Snyder, J. J. Kirkland, "Introduction to Modern Liquid Chromatography," 2nd Ed., Wiley & Sons, Inc., New York, 1979, p. 211, FIG. 5.13]. The columns resulting from Reactions 1-4 were filled at a constant inlet pressure of 6000 psi and those for Reactions 5-12 at 3000 psi. Both used 240 mL of neat methanol per column. The column blanks had inside diameters of 6.2 mm and a length of 250 mm. The inlet and outlet fittings contained sintered stainless steel frits of nominal 2 $\mu$m porosity. Excessive back pressure was observed with a test column packed at 6000 psi with silica from Reaction No. 5. Samples produced with a weight ratio of $(NH_4)HF_2$ to silica exceeding 1.4 could not be successfully loaded at 3000 psig under these conditions due to excessive back pressure.

Standard SEC experiments were conducted on packed columns filled with test silicas according to methods described by Yau et al. ["Modern Size-Exclusion Liquid Chromatography," Wiley-Interscience, NY (1979)]. The instrument used was a Du Pont Model 8800 HPLC equipped with a fixed wavelength detector operating at 254 nm. The mobile phase was neat tetrahydrofuran (THF, Baker Chemical HPLC grade). The flow rate was 1.00 cm$^3$ min$^{-1}$ and the experiments were conducted at ambient temperatures. The sample consisted of 1,800,000 molecular weight polystyrene standard (Pressure Chemical) and toluene in concentrations of about 1 mg/mL in THF. The samples were introduced into the flowing mobile phase stream by use of a sample injector (Rheodyne Model 7125). The injection volumn was 20.0 $\mu$L. Chromatographic elution profiles in analog form were digitized by a model 760 Nelson Interface device in which data were retrieved and archived on a Hewlett Packard Model 9000 series 220 computer.

The volume corresponding to total exclusion ($V_o$) was measured by the elution volume of the 1,800,000 MW polystyrene standard. The volume corresponding to total permeation volume ($V_m$) was measured by the elution volume of toluene which is presumed to explore all of the volume in the column not occupied by silica. For column blanks of these dimensions, the empty volume is 7.55 cm$^3$ ($V_c$). The total volume in the tube can be expressed as:

$$V_c = V_o + V_p + V_s$$

where, $V_c$ = volume inside the empty column blank in cm$^3$
$V_o$ = total exclusion volume measured by the 1,800,000 MW standard in cm$^3$
$V_p$ = pore volume of the silica in cm$^3$g$^{-1}$
$V_s$ = volume occupied by silica excluding the pore volume in cm$^3$
also, $V_m = V_o + V_p$
$V_s = V_c - V_m$
$V_p = V_m - V_o$ The porous fraction, equal to the ratio of the pore volume to the silica volume can be expressed as:

$$\Phi = \frac{V_m - V_o}{V_c - V_o}$$

The specific pore volume in cm$^3$g$^{-1}$ can be calculated from the following:

$$\sigma = \frac{V_m - V_o}{\delta(V_c - V_m)}$$

where, $\delta$ = the density of silica equal to 2.20 g cm$^{-3}$

The chromatographic parameters were measured with each column and the $\Phi$ and $\sigma$ calculated. The results are presented in Table 2.

TABLE 2

| Chromatographic Measurements on PSM 500 | | | | | | |
|---|---|---|---|---|---|---|
| Reaction Number | $V_o$ (cm$^3$) | $V_m$ (cm$^3$) | $V_p$ (cm$^3$) | $V_s$ (cm$^3$) | $\beta$ — | $\Phi$ — | $\sigma$ (cm$^3$ g$^{-1}$) |
| 1 | 3.34 | 5.43 | 2.09 | 2.12 | 0.00 | 0.496 | 0.448 |
| 2 | 3.31 | 5.51 | 2.20 | 2.04 | 0.10 | 0.531 | 0.490 |
| 3 | 3.33 | 5.56 | 2.23 | 1.99 | 0.12 | 0.528 | 0.509 |
| 4 | 3.31 | 5.57 | 2.26 | 1.98 | 0.14 | 0.533 | 0.519 |
| 5 | 3.29 | 5.55 | 2.26 | 2.00 | 0.16 | 0.531 | 0.513 |
| 6 | 3.25 | 5.54 | 2.29 | 2.01 | 0.18 | 0.533 | 0.518 |
| 7 | 3.28 | 5.54 | 2.26 | 2.01 | 0.20 | 0.529 | 0.511 |
| 8 | 3.30 | 5.62 | 2.32 | 1.93 | 0.40 | 0.546 | 0.546 |
| 9 | 3.38 | 5.80 | 2.42 | 1.75 | 0.60 | 0.580 | 0.629 |
| 10 | 3.19 | 5.85 | 2.66 | 1.70 | 0.80 | 0.610 | 0.711 |
| 11 | 3.10 | 6.05 | 2.95 | 1.50 | 1.20 | 0.663 | 0.893 |
| 12 | 3.14 | 6.25 | 3.11 | 1.30 | 1.40 | 0.705 | 1.087 |

B. Porosity Control on Zorbax ® PSM 300

Identical methods as described in Example 1.A. were used to treat Zorbax ® PSM 300 porous silica microspheres with (NH$_4$)HF$_2$ and to obtain chromatographic measurements. The treatment conditions and results are presented in Tables 3 and 4.

TABLE 3

| Ammonium Bifluoride Treatment on PSM 300 | | | |
|---|---|---|---|
| Reaction Number | Weight of Silica (g) | Weight of (NH$_4$)HF$_2$ (g) | Weight of (NH$_4$)HF$_2$ Weight of Silica ($\beta$) |
| 1 | 10.00 | 0.007 | 0.0000 |
| 2 | 10.03516 | 2.01273 | 0.2006 |
| 3 | 10.02327 | 4.02129 | 0.4012 |
| 4 | 10.02513 | 6.06700 | 0.6052 |
| 5 | 10.04826 | 8.04184 | 0.8003 |
| 6 | 10.02781 | 12.00767 | 1.1974 |

TABLE 4

| Chromatographic Measurements on Zorbax ® PSM 300 | | | | | | |
|---|---|---|---|---|---|---|
| Reaction Number | $V_o$ (cm$^3$) | $V_m$ (cm$^3$) | $V_p$ (cm$^3$) | $V_s$ (cm$^3$) | $\beta$ — | $\Phi$ — | $\sigma$ (cm$^3$ g$^{-1}$) |
| 1 | 3.50 | 5.76 | 2.26 | 1.78 | 0.00 | 0.558 | 0.573 |
| 2 | 3.50 | 5.77 | 2.27 | 1.78 | 0.20 | 0.560 | 0.580 |
| 3 | 3.39 | 5.94 | 2.55 | 1.61 | 0.40 | 0.613 | 0.720 |
| 4 | 3.28 | 5.99 | 2.71 | 1.56 | 0.60 | 0.635 | 0.790 |
| 5 | 3.31 | 6.13 | 2.82 | 1.42 | 0.80 | 0.665 | 0.902 |
| 6 | 3.25 | 6.33 | 3.08 | 1.22 | 1.20 | 0.716 | 1.148 |

C. Porosity Control of Zorbax ® PSM 1000

Identical methods as described in Example 1.A. were used to treat Zorbax ® PSM 1000 porous silica microspheres with (NH$_4$)HF$_2$ and to obtain chromatographic measurements except that the column loading pressure was 3000 psi for all samples and a 9,000,000 molecular weight polystyrene standard was used to measure $V_o$. The treatment conditions and results are presented in Tables 5 and 6.

TABLE 5

| Ammonium Bifluoride Treatment on PSM 1000 | | | |
|---|---|---|---|
| Reaction Number | Weight of Silica (g) | Weight of (NH$_4$)HF$_2$ (g) | Weight of (NH$_4$)HF$_2$ Weight of Silica ($\beta$) |
| 1 | 10.00 | 0.00 | 0.0000 |
| 2 | 9.99873 | 2.00025 | 0.2001 |
| 3 | 10.00226 | 4.00055 | 0.3999 |
| 4 | 10.00099 | 5.99950 | 0.5999 |
| 5 | 9.99831 | 8.00054 | 0.8002 |
| 6 | 9.99789 | 9.99297 | 0.9995 |

TABLE 6

| Chromatographic Measurements on PSM 1000 | | | | | | |
|---|---|---|---|---|---|---|
| Reaction Number | $V_o$ (cm$^3$) | $V_m$ (cm$^3$) | $V_p$ (cm$^3$) | $V_s$ (cm$^3$) | $\beta$ — | $\Phi$ — | $\sigma$ — |
| 1 | 3.43 | 5.23 | 1.80 | 2.32 | 0.00 | 0.437 | 0.353 |
| 2 | 3.32 | 5.38 | 2.06 | 2.17 | 0.20 | 0.487 | 0.432 |
| 3 | 3.34 | 5.40 | 2.06 | 2.15 | 0.40 | 0.489 | 0.436 |
| 4 | 3.40 | 5.56 | 2.16 | 1.99 | 0.60 | 0.520 | 0.493 |
| 5 | 3.33 | 5.49 | 2.16 | 2.06 | 0.80 | 0.511 | 0.477 |
| 6 | 3.34 | 5.78 | 2.44 | 1.77 | 1.00 | 0.580 | 0.626 |

For each porous silica, the general equation allowing prediction of any desired 0 once 0°, the initial porosity, known is as follows:

$$\Phi = \Phi^\circ + m\beta$$

Table 7 summarizes the linear regression statistics for the data presented in Tables 2, 4, and 6.

TABLE 7
Least Squares Regression Fit of Straight Line to Data

| Silica | Initial Porosity Φ | Slope m | Correlation Coefficient |
| --- | --- | --- | --- |
| PSM 300 | 0.550 | 0.1404 | 0.98796 |
| PSM 500 | 0.506 | 0.1347 | 0.99134 |
| PSM 1000 | 0.456 | 0.1169 | 0.92856 |

These results demonstrate that the porosity of porous silica microspheres can be increased in a controlled and predictable manner.

EXAMPLE 2
Measurement of Surface Acidity of Zorbax ® PSM 500 Samples

The columns of Example 1.A. were equilibrated with a mobile phase consisting of 15% methanol and 85% 0.2M sodium dihydrogen phosphate (pH 4.6) by pumping 200 mL at a flow rate of 3.6 mL/min at room temperature. The capacity factor of thiamine was determined under these conditions. The columns were re-equilibrated with a mobile phase consisting of 15% methanol and 85% 0.02M sodium dihydrogen phosphate (pH4.6) by passing 200 mL at a flow rate of 3.6 mL/min. The capacity factor of thiamine was again determined under the conditions of lower sodium concentration.

The data was used to calculate the parameters in the equation:

$$k' = (m/\text{sodium concentration}) + C$$

which correspond to the slope (m) and intercept (C) of a plot of capacity factor (k') against the inverse of the sodium concentration. The results are shown in Table 8. The capacity factor is significantly reduced in all cases indicating significantly reduced surface acididty. The slope and intercept are essentially independent of the proportion of ammonium bifluoride used.

TABLE 8

| Column (Reaction #) | k' (0.2 M) | k' (0.02 M) | m | C | β |
| --- | --- | --- | --- | --- | --- |
| 1 | 0.67 | 0.84 | 0.0032 | 0.651 | 0.0000 |
| 2 | * | * |  |  | 0.1004 |
| 3 | 0.24 | 0.25 | 0.0001 | 0.242 | 0.1199 |
| 4 | 0.21 | 0.22 | 0.0001 | 0.218 | 0.1403 |
| 5 | 0.23 | 0.22 | −0.0002 | 0.231 | 0.1609 |
| 6 | + | + |  |  | 0.1810 |
| 7 | 0.19 | 0.21 | 0.0003 | 0.191 | 0.2012 |
| 8 | 0.22 | 0.31 | 0.0018 | 0.207 | 0.4003 |
| 9 | 0.19 | 0.22 | 0.0005 | 0.190 | 0.6000 |
| 10 | * | * |  |  | 0.8006 |
| 11 | + | + |  |  | 1.1994 |
| 12 | + | + |  |  | 1.3974 |

*Column packed bed collapsed, giving high operating pressure.
+Not tested.

EXAMPLE 3
Measurement of Surface Acidity of Zorbax ® PSM 300 Samples

The methodology of Example 2 was applied to the columns packed in Example 1.B. The results are shown in Table 9. Again, little effect of increases in the quantity of ammonium bifluoride was seen on the retention of thiamine once sufficient ammonium bifluoride was added to the reaction to remove the surface layer of silica.

TABLE 9

| Column (Reaction #) | k' (0.2 M) | k' (0.02 M) | m | C | β |
| --- | --- | --- | --- | --- | --- |
| 1 | 0.86 | 1.35 | 0.0091 | 0.814 | 0.0000 |
| 2 | 0.25 | 0.42 | 0.0033 | 0.227 | 0.2006 |
| 3 | 0.26 | 0.35 | 0.0017 | 0.247 | 0.4012 |
| 4 | 0.27 | 0.37 | 0.0020 | 0.256 | 0.6052 |
| 5 | 0.25 | 0.36 | 0.0020 | 0.244 | 0.8003 |
| 6 | 0.25 | 0.34 | 0.0017 | 0.240 | 1.1974 |

EXAMPLE 4
Reduction in Surface Acidity of Silica Particles

A. Ammonium Bifluoride Treatment

Silica (Zorbax ® PSM 150, 20 g) was suspended in water (200 mL) and a solution of ammonium bifluoride (4 g) in water (25 mL) was added. The mixture was stirred for 48 hours. The product was filtered, washed with water (200 mL) and was suspended in water (1 L) and filtered three times. The filter cake was washed with methanol (2×200 mL) and Freon ® (2×200 mL) and was dried in a vacuum oven at 110°.

B. Nitric Acid Treatment

Silica (Zorbax PSM 150, 20 g) was suspended in 4N nitric acid (500 mL) and was heated under reflux with stirring for 16 hours. The product was filtered and was washed and dried as described for the ammonium bifluoride treated silica in A. above.

C. Measurement of Relative Acidity

The two silica samples from (a) and (b) above were packed by the slurry technique of Example 1 into columns (15 cm×4.6 mm). The columns were equilibrated with a mobile phase consisting of a mixture of methanol and 0.2M sodium dihydrogen phosphate (pH 4.6) (15:85) by passing 50 mL at a flow rate of 2 mL/min. The capacity factor of thiamine was determined for both columns. The columns were re-equilibrated with a mobile phase consisting of a mixture of methanol and 0.02M sodium dihydrogen phosphate (pH 4.6) (15:85) and the capacity factor of thiamine was again determined.

The slope and intercept of a graph plotting capacity factor of thiamine against the inverse of sodium ion concentration in the mobile phase were calculated for each column. The slope of the plot, which represents a value related to the concentration and strength of the acidic sites on the surface was reduced by a factor of 4 (0.034 against 0.137) for the silica treated with ammonium bifluoride compared with that treated with nitric acid. The intercept, which is related to non-ionic interactions (for example hydrophobic interactions), was reduced by a factor of 1.94. The data are presented in Table 10.

TABLE 10

| Silica Treatment | k' (0.2 M) | k' (0.02 M) | m | C |
| --- | --- | --- | --- | --- |
| HNO$_3$ | 2.93 | 10.20 | 0.137 | 2.12 |
| (NH$_4$)HF$_2$ | 1.29 | 3.10 | 0.034 | 1.09 |

These results indicate that (NH$_4$)HF$_2$ treatment is more effective in reducing surface acidity than HNO$_3$ treatment.

EXAMPLE 5

Reduction in Silica Surface Hydrophobicity by Ammonium Bifluoride Treatment

Samples of silica (Zorbax® PSM 60 porous silica microspheres) were treated with ammonium bifluoride and with 4N Nitric acid as described in Example 4. Each material was packed into columns (15 cm×4.6 mm) as described in Example 1.

Each column was equilibrated with mobile phases consisting of mixtures of methanol and 0.05M sodium dihydrogen phosphate (adjusted to pH 2.1 with phosphoric acid) and the capacity factors of toluene at methanol concentrations of 10, 20, 30 and 50% were measured. (A separate experiment using a single silica column with mobile phases buffered at pH 2.1 and 7.0 with the same methanol compositions was carried out and demonstrated that the buffer pH had only a small effect on the capacity factor of toluene. This indicated that the toluene was retained by non-ionic groups such as siloxane bridges on the silica surface. See Table 11).

TABLE 11

| Effect of pH on Toluene Retention | | |
|---|---|---|
| % Methanol | k' (pH 2.1) | k' (pH 7.0) |
| 10 | 0.88 | 0.83 |
| 20 | 0.54 | 0.42 |
| 30 | 0.35 | 0.30 |
| 50 | 0.17 | 0.15 |

The capacity factors for toluene on the bifluoride treated silica were half those on the nitric acid treated silica, indicating that the bifluoride treated surface was less hydrophobic than the nitric acid treated silica. This indicates that the silica is more completely rehydroxylated by bifluoride than by nitric acid. It is expected that the nitric acid treatment would remove oxidizable (i.e., residual organic) material from the surface which could also give rise to a higher retention of toluene.

Plots of log capacity factor against % methanol were constructed and the slopes of the graphs determined. The slope of the graph for the bifluoride treated silica was half that of the nitric acid treated silica.

The data of this example is shown in Table 12.

TABLE 12

| | Retention of Toluene on Silicas at Different Methanol Concentrations | | | | |
|---|---|---|---|---|---|
| Silica Treatment | k' (10% MeOH) | k' (20% MeOH) | k' (30% MeOH) | k' (50% MeOH) | Slope of log k' vs % MeOH |
| $NH_4 \cdot HF_2$ | 0.27 | 0.19 | 0.15 | 0.13 | −0.0076 |
| $HNO_3$ | 0.66 | 0.41 | 0.28 | 0.15 | −0.0158 |

We claim:

1. A process of increasing the porosity $\Phi°$ to a desired value $\Phi$ ranging from about 0.5 to about 0.8, cleaning the surface, and rehydroxylating porous silica microspheres having an average diameter of about 0.5 to about 34 μm, substantially all of said microspheres having a diameter ranging from about 0.5 to about 1.5 times said average diameter; said microspheres consisting essentially of a plurality of substantially uniform-size colloidal silica particles, arranged in an interconnected three-dimensional lattice; said colloidal particles occupying less than about 50 volume percent of said microspheres with the remaining volume being occupied by interconnected pores having substantially uniform pore size distribution by the steps of: calculating the quantity of $(NH_4)HF_2$ needed to provide the porosity according to the linear equation $$\Phi = \Phi° + m(\beta)$$

where $\beta$ is the weight ratio of $(NH_4)HF_2$ to that of the silica microspheres, m ranges from about 0.10 to 0.14, treating the microspheres with water in the presence of such quantity of $(NH_4)HF_2$ to form a slurry of microspheres, filtering the slurry to recover the microspheres, and washing and drying the microspheres.

2. The process set forth in claim 1 wherein the determined calculated solution concentration of $(NH_4)HF_2$ lies in the range from about 1% (w/v) to about 35% (w/v).

* * * * *